US007822802B2

(12) United States Patent
Chen et al.

(10) Patent No.: US 7,822,802 B2
(45) Date of Patent: Oct. 26, 2010

(54) APPARATUS AND METHOD FOR MERGING WIRELESS DATA INTO AN ESTABLISHED PROCESS CONTROL SYSTEM

(75) Inventors: Deji Chen, Austin, TX (US); Shenling Yang, Austin, TX (US); Mark J. Nixon, Round Rock, TX (US); Tom Aneweer, Georgetown, TX (US); John R. Shepard, Austin, TX (US); Aloysius K. Mok, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 889 days.

(21) Appl. No.: 11/537,489

(22) Filed: Sep. 29, 2006

(65) Prior Publication Data

US 2008/0081579 A1   Apr. 3, 2008

(51) Int. Cl.
*G06F 15/16* (2006.01)
(52) U.S. Cl. .................................................. 709/201
(58) Field of Classification Search .................. 709/201
See application file for complete search history.

(56) References Cited

U.S. PATENT DOCUMENTS

| 5,826,060 | A | * | 10/1998 | Santoline et al. ............... 703/6 |
| 5,923,557 | A | * | 7/1999 | Eidson ........................ 700/129 |
| 6,129,449 | A | * | 10/2000 | McCain et al. ............... 700/244 |
| 6,145,027 | A | * | 11/2000 | Seshan et al. .................. 710/22 |
| 6,314,413 | B1 | * | 11/2001 | Otte ............................. 706/15 |
| 6,330,485 | B1 | * | 12/2001 | Hsu et al. ...................... 700/90 |
| 6,505,247 | B1 | * | 1/2003 | Steger et al. ................. 709/224 |
| 6,842,660 | B2 | * | 1/2005 | Tripathi et al. ............... 700/121 |

(Continued)

FOREIGN PATENT DOCUMENTS

GB    2 427 329    12/2006

OTHER PUBLICATIONS

Great Britain Search Report for Application No. GB0719121.6, dated Dec. 10, 2007.

(Continued)

*Primary Examiner*—Hassan Phillips
*Assistant Examiner*—Imad Hussain
(74) *Attorney, Agent, or Firm*—Marshall, Gerstein & Borun LLP

(57) ABSTRACT

A method and system of communicating between a wireless network and a process control system communicatively coupled to a server via a process control system interface, such as OPC or a proprietary API. The wireless network may be a mesh network and the server may be a mesh server. The server receives data from the wireless network, where the data is generated from an input/output data point within the wireless network. The server maps the data between the input/output data point and a data point placeholder within the process control system. The server writes the mapped data to the corresponding data point placeholder of the process control system via the process control interface, and the mapped data is provided to the process control system as process control data native to the process control system. Process control data may also be provided to the server, mapped between a data point placeholder of the process control system and an input/output data point of the wireless network, and the mapped process control data is written to the corresponding input/output data point.

24 Claims, 4 Drawing Sheets

U.S. PATENT DOCUMENTS

| | | | |
|---|---|---|---|
| 2003/0014500 A1* | 1/2003 | Schleiss et al. | 709/218 |
| 2003/0043052 A1 | 3/2003 | Tapperson et al. | |
| 2003/0105535 A1* | 6/2003 | Rammler | 700/17 |
| 2003/0109951 A1* | 6/2003 | Hsiung et al. | 700/108 |
| 2003/0195639 A1* | 10/2003 | Nixon et al. | 700/19 |
| 2004/0024891 A1* | 2/2004 | Agrusa et al. | 709/230 |
| 2004/0153594 A1* | 8/2004 | Rotvold et al. | 710/305 |
| 2005/0010931 A1* | 1/2005 | Langkafel et al. | 719/328 |
| 2005/0028024 A1* | 2/2005 | Kataoka et al. | 714/4 |
| 2005/0066104 A1* | 3/2005 | Train et al. | 710/305 |
| 2005/0088653 A1* | 4/2005 | Coates et al. | 356/419 |
| 2005/0276233 A1* | 12/2005 | Shepard et al. | 370/254 |
| 2006/0284058 A1* | 12/2006 | Coates et al. | 250/226 |
| 2007/0106761 A1* | 5/2007 | Beoughter et al. | 709/219 |
| 2007/0156253 A1* | 7/2007 | De Silvio | 700/6 |
| 2007/0160017 A1* | 7/2007 | Meier et al. | 370/338 |
| 2009/0122808 A1* | 5/2009 | Sharif-Ahmadi et al. | 370/458 |

OTHER PUBLICATIONS

Caro, Dick, "ZigBee Short on Power by Design," 4 pages (May 1, 2004).

Cutler, Timothy, "Wireless Solves Legacy Systems," 5 pages (Jan. 1, 2004).

Delta V, Key Technologies, http://easydeltav.com/keytechnologies/index.asp. © 1996-2008.

Echelon, "Fourth Utility Award to Bring Total Echelon NES Households in Denmark to 810,000," http://echelon.com/, (2008).

IEEE Standards Wireless Zone, http://standards.ieee.org/wireless/, (2008).

Moss, Graham, "Wireless Ain't Wireless," 6 pages (Apr. 2003).

Vaughn-Nichols, Steven J., "Achieving Wireless Broadband with WiMax," 4 pages (Jun. 2004).

Vaughn-Nichols, Steven J., "Wireless Middleware: Glue for the Mobile Infrastructure," 3 pages ( May 2004).

Hieb, "Developing a Small Wireless Control Network," Master's Thesis, University of Texas at Austin (2003).

Nixon et al., "A Framework to Transmit Process Control Data Over Commercial Wireless Networks," The Instrumentation, Systems and Automation Society, Presented at ISA Expo 2004, © 2004 ISA.

* cited by examiner

APPARATUS AND METHOD FOR MERGING WIRELESS DATA INTO AN ESTABLISHED PROCESS CONTROL SYSTEM

FIELD OF THE TECHNOLOGY

The present disclosure relates generally to process control systems within process plants and, more particularly, to communications between a process control system and wireless mesh networks.

BACKGROUND

Process control systems are widely used in factories and/or plants in which products are manufactured or processes are controlled (e.g., chemical manufacturing, power plant control, etc.). Process control systems are also used in the harvesting of natural resources such as, for example, oil and gas drilling and handling processes, etc. In fact, virtually any manufacturing process, resource harvesting process, etc. can be automated through the application of one or more process control systems. It is believed the process control systems will eventually be used more extensively in agriculture as well.

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

The various devices within the process plant may be interconnected in physical and/or logical groups to create a logical process, such as a control loop. Likewise, a control loop may be interconnected with other control loops and/or devices to create sub-units. A sub-unit may be interconnected with other sub-units to create a unit, which in turn, may be interconnected with other units to create an area. Process plants generally include interconnected areas, and business entities generally include process plants which may be interconnected. As a result, a process plant includes numerous levels of hierarchy having interconnected assets, and a business enterprise may include interconnected process plants. In other words, assets related to a process plant, or process plants themselves, may be grouped together to form assets at higher levels.

The manner in which process control systems are implemented has evolved over the years. Older generations of process control systems were typically implemented using dedicated, centralized hardware and hard-wired connections. However, modern process control systems are typically implemented using a highly distributed network of workstations, intelligent controllers, smart field devices, and the like, some or all of which may perform a portion of an overall process control strategy or scheme. In particular, most modern process control systems include smart field devices and other process control components that are communicatively coupled to each other and/or to one or more process controllers via one or more digital data buses. In addition to smart field devices, modern process control systems may also include analog field devices such as, for example, 4-20 milliamp (mA) devices, 0-10 volts direct current (VDC) devices, etc., which are typically directly coupled to controllers as opposed to a shared digital data bus or the like.

In a typical industrial or process plant, a distributed control system (DCS) is used to control many of the industrial processes performed at the plant. The plant may have a centralized control room having a computer system with user input/output (I/O), a disc I/O, and other peripherals known in the computing art with one or more process controllers and process I/O subsystems communicatively connected to the centralized control room. Additionally, one or more field devices are typically connected to the I/O subsystems and to the process controllers to implement control and measurement activities within the plant. While the process I/O subsystem may include a plurality of I/O ports connected to the various field devices throughout the plant, the field devices may include various types of analytical equipment, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, indicator lights or any other device typically used in process plants.

As used herein, the term "field device" encompasses these devices, as well as any other device that performs a function in a control system. In any event, field devices may include, for example, input devices (e.g., devices such as sensors that provide status signals that are indicative of process control parameters such as, for example, temperature, pressure, flow rate, etc.), as well as control operators or actuators that perform actions in response to commands received from controllers and/or other field devices.

Traditionally, analog field devices have been connected to the controller by two-wire twisted pair current loops, with each device connected to the controller by a single two-wire twisted pair. Analog field devices are capable of responding to or transmitting an electrical signal within a specified range. In a typical configuration, it is common to have a voltage differential of approximately 20-25 volts between the two wires of the pair and a current of 4-20 mA running through the loop. An analog field device that transmits a signal to the control room modulates the current running through the current loop, with the current being proportional to the sensed process variable.

Historically, most traditional field devices have had either a single input or a single output that was directly related to the primary function performed by the field device. For example, the only function implemented by a traditional analog resistive temperature sensor is to transmit a temperature by modulating the current flowing through the two-wire twisted pair, while the only function implemented by a traditional analog valve positioner is to position a valve somewhere between a fully open and a fully closed position based on the magnitude of the current flowing through the two-wire twisted pair.

More recently, field devices that are part of hybrid systems become available that superimpose digital data on the current loop used to transmit analog signals. One such hybrid system is known in the control art as the Highway Addressable Remote Transducer (HART) protocol. The HART system uses the magnitude of the current in the current loop to send an analog control signal or to receive a sensed process variable (as in the traditional system), but also superimposes a digital carrier signal upon the current loop signal. This enables two-way field communication to take place and makes it possible for additional information beyond just the normal process variable to be communicated to/from a smart field instrument. Generally, the digital carrier signal is used to send secondary and diagnostic information and is not used to realize the primary control function of the field device. Examples of information provided over the digital carrier signal include secondary process variables, diagnostic information (including sensor diagnostics, device diagnostics, wiring diagnostics, and process diagnostics), operating temperatures, a sensor temperature, calibration information, device ID numbers, materials of construction, configuration or programming information, etc. Accordingly, a single hybrid field device may have a variety of input/output data points generating a variety of input/output variables and may implement a variety of functions.

More recently, a newer control protocol has been defined by the Instrument Society of America (ISA). The new protocol is generally referred to as Fieldbus, and is specifically referred to as SP50, which is as acronym for Standards and Practice Subcommittee 50. Fieldbus is a nonproprietary open standard and is now prevalent in the industry and, as such, many types of Fieldbus devices have been developed and are in use in process plants. Because Fieldbus devices are used in addition to other types of field devices, such as HART and 4-20 mA devices, with a separate support and I/O communication structure associated with each of these different types of devices.

Newer smart field devices, which are typically all digital in nature, have maintenance modes and enhanced functions that are not accessible from or compatible with older control systems. Even when all components of a distributed control system adhere to the same standard (such as the Fieldbus standard), one manufacturer's control equipment may not be able to access the secondary functions or secondary information provided by another manufacturer's field devices.

Thus, one particularly important aspect of process control system design involves the manner in which field devices are communicatively coupled to each other, to controllers and to other systems or devices within a process control system or a process plant. In general, the various communication channels, links and paths that enable the field devices to function within the process control system are commonly collectively referred to as an input/output (I/O) communication network. One development in communicating process control information between various systems, devices and components within a process control system is object linking and embedding (OLE) for process control (OPC) which provides a mechanism that eliminates the need for individual custom communications software drivers that convey real time process control data between the systems, devices and components of a process control system. As is well known, OPC is based on Microsoft object linking and embedding (OLE) technology, which provides a common interface for the various systems, devices and components making up a process control system. OPC further defines an application programming interface (API) for different process control systems to exchange information. As such, OPC has been used as an industry standard to I/O communications within and among process control systems. Typically, each of the systems, devices and components of the process control system includes an OPC communication layer and, thus, speaks a common standardized language for purposes of conveying process control information.

Further, the communication network topology and physical connections or paths used to implement an I/O communication network can have a substantial impact on the robustness or integrity of field device communications, particularly when the I/O communications network is subjected to environmental factors or conditions associated with the process control system. For example, many industrial control applications subject field devices and their associated I/O communication networks to harsh physical environments (e.g., high, low or highly variable ambient temperatures, vibrations, corrosive gases or liquids, etc.), difficult electrical environments (e.g., high noise environments, poor power quality, transient voltages, etc.), etc. In any case, environmental factors can compromise the integrity of communications between one or more field devices, controllers, etc. In some cases, such compromised communications could prevent the process control system from carrying out its control routines in an effective or proper manner, which could result in reduced process control system efficiency and/or profitability, excessive wear or damage to equipment, dangerous conditions that could damage or destroy equipment, building structures, the environment and/or people, etc.

In order to minimize the effect of environmental factors and to assure a consistent communication path, I/O communication networks used in process control systems have historically been hardwired networks, with the wires being encased in environmentally protected materials such as insulation, shielding and conduit. Also, the field devices within these process control systems have typically been communicatively coupled to controllers, workstations, and other process control system components using a hardwired hierarchical topology in which non-smart field devices are directly coupled to controllers using analog interfaces such as, for example, 4-20 mA, 0-10 VDC, etc. hardwired interfaces or I/O boards. Smart field devices, such as Fieldbus devices, are also coupled via hardwired digital data busses, which are coupled to controllers via smart field device interfaces.

While hardwired I/O communication networks can initially provide a robust I/O communication network, their robustness can be seriously degraded over time as a result of environmental stresses (e.g., corrosive gases or liquids, vibration, humidity, etc.). For example, contact resistances associated with the I/O communication network wiring may increase substantially due to corrosion, oxidation and the like. In addition, wiring insulation and/or shielding may degrade or fail, thereby creating a condition under which environmental electrical interference or noise can more easily corrupt the signals transmitted via the I/O communication network wires. In some cases, failed insulation may result in a short circuit condition that results in a complete failure of the associated I/O communication wires.

Additionally, hardwired I/O communication networks are typically expensive to install, particularly in cases where the I/O communication network is associated with a large industrial plant or facility that is distributed over a relatively large geographic area, for example, an oil refinery or chemical plant that consumes several acres of land. In many instances, the wiring associated with the I/O communication network must span long distances and/or go through, under or around many structures (e.g., walls, buildings, equipment, etc.) Such long wiring runs typically involve substantial amounts of labor, material and expense. Further, such long wiring runs are especially susceptible to signal degradation due to wiring impedances and coupled electrical interference, both of which can result in unreliable communications.

Moreover, such hardwired I/O communication networks are generally difficult to reconfigure when modifications or updates are needed. Adding a new field device typically requires the installation of wires between the new field device and a controller. Retrofitting a process plant in this manner may be very difficult and expensive due to the long wiring runs and space constraints that are often found in older process control plants and/or systems. High wire counts within conduits, equipment and/or structures interposing along available wiring paths, etc., may significantly increase the difficulty associated with retrofitting or adding field devices to an existing system. Exchanging an existing field device with a new device having different field wiring requirements may present the same difficulties in the case where more and/or different wires have to be installed to accommodate the new device. Such modifications may often result in significant plant downtime.

Due to the expense in implementing and maintaining such I/O communications, any benefit resulting from the deployment and utilization of I/O devices such as sensors, actuators, etc. is balanced against the cost. As a result, I/O devices are often selectively deployed only in key points of the process control system in order to reduce cost. While more important or critical process control information is collected, there remains a vast amount of non-critical process control information that is not collected or utilized by the process control system, but which, nonetheless, could be useful to tools of the process control system, such as diagnostic applications, process operations, maintenance, business functions, etc. or generally useful to anyone involved in the process control system such as a maintenance person, a process control operator or a business person. Accordingly, not all process control information is collected by the process control system and optimal control is not achieved.

Wireless I/O communication networks have been used to alleviate some of the difficulties associated with hardwired I/O networks, and to alleviate the costs involved in deploying sensors and actuators within the process control system. Wireless I/O communication networks have also been suggested for process control systems and portions thereof that are relatively inaccessible or inhospitable for hardwire I/O communication networks. For example, Shepard et al., U.S. patent application Ser. No. 11/156,215 entitled "Wireless Architecture And Support For Process Control Systems" and filed Jun. 17, 2005, the contents of which are expressly incorporated by reference herein, discloses that relatively inexpensive wireless mesh networks may be deployed within a process control system, either alone or in combination with point-to-point communications, to produce a robust wireless communication network that can be easily set up, configured, changed and monitored, to thereby make the wireless communication network more robust, less expensive and more reliable.

Aside from the process control system, mesh networks may be deployed outside the realm of the process control system as an inexpensive communications system for collecting other non-critical data, such as auxiliary data that the process control system does not or cannot access within its own scope. Such auxiliary data may include anything outside of the process control system, such as control room light switches, stock prices, weather forecasts, etc. However, such auxiliary data, or other data from a mesh network may not be collected by the process control system, because it may not be possible to deploy an I/O device for the process control system.

Whether a mesh network is deployed in a process control system, or as a separate network outside the realm of a process control system, the process control system can only communication with I/O devices that it understands. This may not be the case with input/output data points in a mesh network. While OPC may provide a uniform process control interface for I/O devices within the process control system, OPC is not always amenable to I/O devices outside the process control system. Thus, while mesh networks may help to alleviate the costs and logistical difficulties involved with deploying I/O devices in a process control system and further help to access auxiliary data generally outside the realm of a process control system, communication between the mesh network and the process control system may remain problematic without a mechanism to merge the mesh network data into the process control system.

SUMMARY

A process control system and a wireless network, such as a wireless mesh network, are communicatively coupled to a server. The server may be a mesh server that includes a configuration, a mesh interface and a mesh service. The configuration includes one or more data point maps correlating input/output data points within the mesh network and data point placeholders within the process control system. A data point placeholder provides a unique identification for an input/output data point, and reserves a spot within the process control system for wireless network data from a corresponding input/output data point. The mesh interface may be a set of APIs for each mesh driver and/or mesh network communicatively coupled to the server, or the mesh interface may be unified API for all mesh networks and mesh network drivers. The mesh interface marshals calls between the wireless network drivers and the mesh service.

The mesh service reads the configuration, establishes communication with the process control system via a process control interface, which may be OPC or a proprietary API, and establishes communication with the mesh network via the mesh interface. The mesh service reads the wireless network data from the wireless network, maps the wireless network data between the input/output data point that generated the data and the corresponding data point placeholder in the process control system, and writes the mapped data to the data point placeholder. The mapped data is provided to the process control system as process control data and the data point place holders are treated within the process control system as if they are input/output data points native to the process control system.

Using, the disclosed method and system for communicating between a process control system and a wireless network, data from the wireless network is provided to the process control system to improve system performance of the process control system, and is presented within the process control system as if the data is an integral part of the process control system (e.g., native to the process control system). As such, tools, such as a rich toolset, applications, algorithms, or other mature and comprehensive toolsets within the process control system may use the mesh network data as if the data is process control data. Mesh networks, which are relatively inexpensive to deploy, may thus be used to collect non-critical data which may be otherwise cost-prohibitive to collect and/or inaccessible by the process control system. The non-critical data may include non-critical process control data and data auxiliary to the process control system, but nonetheless may be useful to the process control system and process control system personnel. Users are thus enabled to use the full features of the process control system to handle wireless network data, and opens up new markets for the process control system and extends its usefulness by bringing in extra data that was previously unavailable.

Further, the disclosed method and system may be used to deploy wireless networks within the process control system, either as replacements for existing process control infrastructure (e.g., I/O devices) or as a redundant network that collects the same process control data as the process control system. This reduces deployment costs without effecting or requiring change at the user level. In particular, process control system software may be deployed without any input/output data points, but which use only data point placeholders which are treated as input/output data points.

DETAILED DESCRIPTION

Figure 1:
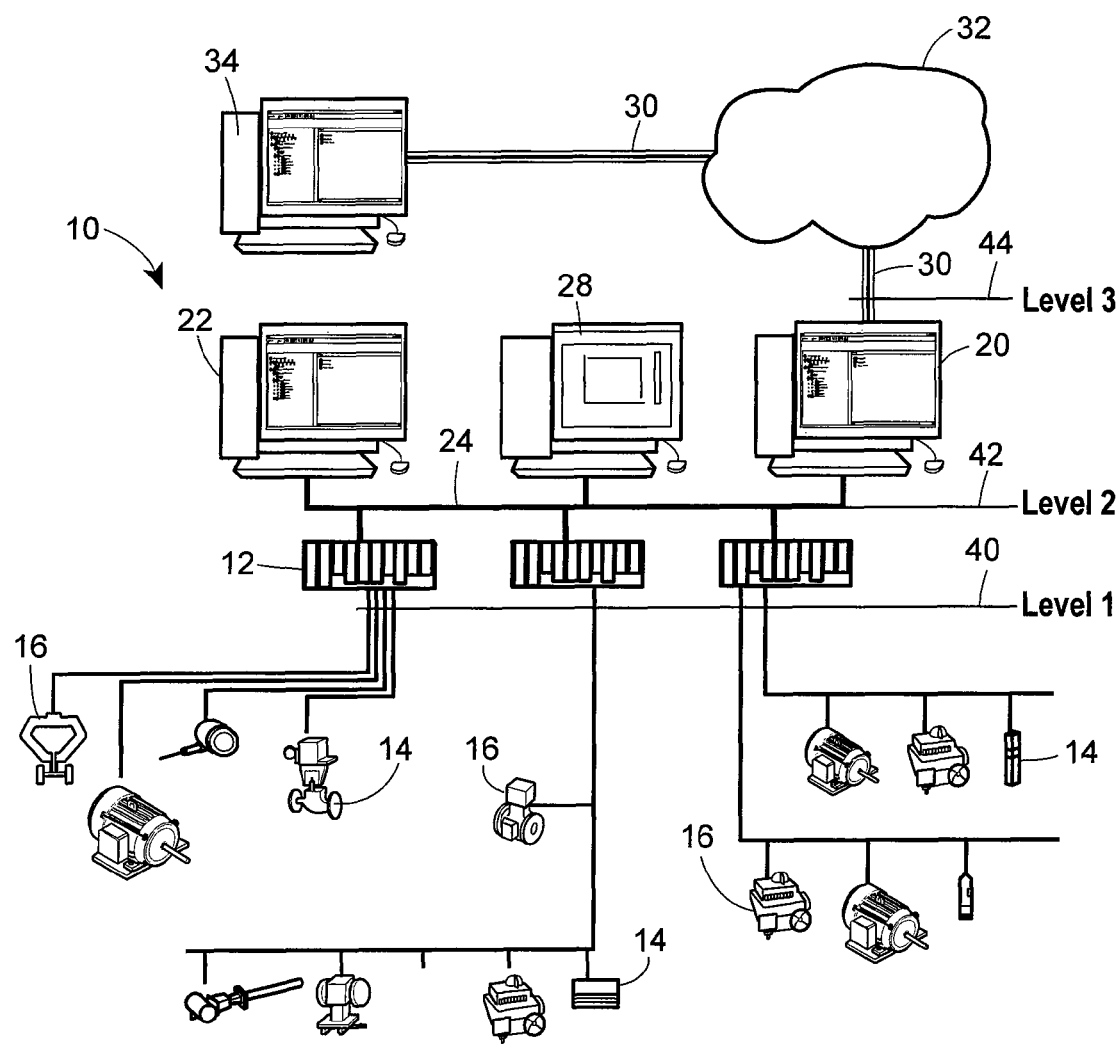
FIG. 1 is a schematic diagram of a process plant displaying an example of a hierarchical structure of equipment and instructions implemented in a process plant.

Referring now to FIG. 1, a process plant 10 includes a distributed process control system having one or more controllers 12, each of which is connected to one or more field devices 14 and 16 via input/output (I/O) devices or cards which may be, for example, Fieldbus interfaces, Profibus interfaces, HART interfaces, standard 4-20 ma interfaces, etc. The controllers 12 are also coupled to one or more host or operator workstations 20 and 22 via a data highway 24 which may be, for example, an Ethernet link. A database 28 may be connected to the data highway 24 and operates as a data historian to collect and store process parameter, status and other data associated with the controllers 12 and field devices 14, 16 within the plant 10. Additionally or alternatively, the database 28 may operate as a configuration database that stores the current configuration of the process control system within the plant 10 as downloaded to and stored within the controllers 12 and field devices 14 and 16. While the controllers 12, the I/O cards and the field devices 14 and 16 are typically located down within and are distributed throughout the sometimes harsh plant environment, the operator workstations 20 and 22 and the database 28 are usually located in control rooms or other less harsh environments easily assessable by controller or maintenance personnel.

As is known, each of the controllers 12, which may be by way of example, the DeltaV controller sold by Fisher-Rosemount Systems, Inc., stores and executes a controller application that implements a control strategy using any number of different, independently executed, control modules or blocks. Each of the control modules can be made up of what are commonly referred to as function blocks wherein each function block is a part or a subroutine of an overall control routine and operates in conjunction with other function blocks (via communications called links) to implement process control loops within the process plant 10. As is well known, function blocks, which may but need not be objects in an object oriented programming protocol, typically perform one of an input function, such as that associated with a transmitter, a sensor or other process parameter measurement device, a control function, such as that associated with a control routine that performs proportional-integral-derivative (PID), fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function chart, ladder logic, etc. and are not limited to being designed and implemented using the function block or any other particular programming technique.

In the plant 10 illustrated in FIG. 1, the field devices 14 and 16 connected to the controllers 12 may be standard 4-20 ma devices, may be smart field devices, such as HART, Profibus, or FOUNDATION® Fieldbus field devices, which include a processor and a memory, or may be any other desired type of field device. Some of these devices, such as Fieldbus field devices (labeled with reference number 16 in FIG. 1), may store and execute modules, or sub modules, such as function blocks, associated with the control strategy implemented in the controllers 12. Function blocks, which may be disposed in two different ones of the Fieldbus field devices 16, may be executed in conjunction with the execution of the control modules within the controllers 12 to implement one or more process control loops, as is well known. Of course, the field devices 14 and 16 may be any types of devices, such as sensors, valves, transmitters, positioners, etc. and the I/O devices may be any types of I/O devices conforming to any desired communication or controller protocol such as HART, Fieldbus, Profibus, etc.

Still further, in a known manner, one or more of the workstations 20 and 22 may include user interface applications to enable a user, such as an operator, a configuration engineer, a maintenance person, etc. to interface with the process control network within the plant 10. In particular, the workstation 22 may include one or more user interface applications which may be executed on a processor within the workstation 22 to communicate with the database 28, the control modules or other routines within the controllers 12 or I/O devices, with the field devices 14 and 16 and the modules within these field devices, etc. to obtain information from the plant, such as information related to the ongoing state of the process control system. The user interface applications may process and/or display this collected information on a display device associated with one or more of the workstations 20 and 22. The collected, processed and/or displayed information may be, for example, process state information, alarms and alerts generated within plant, maintenance data, etc. Likewise, one or more applications may be stored in an executed in the workstations 22 and 20 to perform configuration activities such as creating or configuring the modules to be executed within the plant, to perform control operator activities, such as changing set-points or other control variables, within the plant, etc. Of course the number and type of routines is not limited by the description provided herein and other numbers and types of process control related routines may be stored in an implemented within the workstations 20 and 22 if desired. The workstations 20, 22 may also be connected via, for example, the internet 30, extranet, bus, Ethernet, etc., to a corporate WAN 32 as well as to a computer system 34 that enables remote monitoring of or communication with the plant 10 from remote locations.

As shown in FIG. 1, the process control system includes three network layers. The first layer (level one) 40 is between the field devices 14, 16 and the controllers 12, the second layer (level two) 42 is among the controllers 12 and the workstations 20, 22, and the third layer (level three) 44 is between the workstations 20, 22 and systems external to the process plant 10. Communications at each of the layers 40, 42, 44 may be wireline. However, as will be described further below, wireless networks may be implemented at any of the three network layers of the process control system. As a result, some or all of the I/O devices within a process control system, such as sensors and actuators, may be deployed and communicatively coupled to the process control system using wireline technologies, wireless technologies or combination thereof For example, wireline communications may be maintained between and among the controllers 12, between and among the workstations 20, 22, and between and among the devices 14, 16, whereas wireless communications may be established at the first layer 40 between the devices 14, 16 and the controllers 12, at the second layer 42 between the controllers 12 and the workstations 20, 22 and/or at the third layer 44 between the workstations 20, 22 and the external systems.

The first layer 40 runs the process and has a tight real-time requirement of high predictability and reliability. As indicated above, the network protocols may be industry standards such as HART, Foundation Fieldbus, DeviceNet, etc. The first layer 40 generally utilizes reliable short range data transmissions, and communications at the first layer 40 may involve small data package sizes, such as less than 100 bytes. Wireless technologies at the first layer 40 may include, but are not limited to, ZigBee, WiFi, Bluetooth, Ultra Wideband (UWB), etc., or any other short-range wireless technology. In particular, wireless technologies at the first layer 40 may include any commercial off-the-shelf wireless products to transmit process control data. A network protocol may be implemented on top of the wireless technology at the first layer 40, or a new process control standard may be developed for wireless communication at the first layer 40. In one example, mesh technologies, such as a self-healing wireless mesh technology, may be implemented at the first layer 40.

The second layer 42 supports user interaction, including configuration, control and monitoring. The timing requirement of the second layer 42 may be less than that of the first layer 40, but still has good reliability. The network protocol for the second layer 42 may be proprietary, or an industry standard such as Ethernet. The second layer 42 generally utilizes longer transmission ranges and bigger data package sizes. As a result, the second layer 42 may have less strict requirements as compared to the first layer 40 and commercial off-the-shelf wireless products to transmit process control data, such as satellite, Wi-Max, and other wireless technologies, may be used at this level to support long-range wireless transmission. Microwave and radio may also be used for shorter distances.

The third layer 44 may be considered a gateway of the process control system to other systems, such as corporate systems which may include, but are not limited to, accounting, inventory, management decision systems, etc. At the third layer 44, conventional networks may be deployed, such as an office network, intranet, etc. Communications at the third layer 44 may be of less concern to process control communications, and various conventional wireless technologies may be utilized.

Regardless of the communication technology utilized within the process control system, each of the devices 14, 16 may include one or more actuators, sensors, or other I/O devices. Each of the I/O devices may correspond to an input/output data point, where an input/output data point within the process control system is a source of process control data. Critical process control data may be collected utilizing point-to-point wireline communications. On the other hand, wireless communications, such as a wireless mesh network, may be deployed within the process control system to collect non-critical process control data. However, in a further example, a wireless mesh network may also be used to collect critical process control data, and, as a result, may be used throughout the process control system. Process control systems having an existing wireline, point-to-point communications may have wireline I/O devices gradually replaced with wireless I/O devices, or otherwise have the wireline communications network replaced with a wireless communications network, with minimal change to the existing process control system, such as utilizing the same network protocols used by the wireline, point-to-point process control system.

Figure 2A:
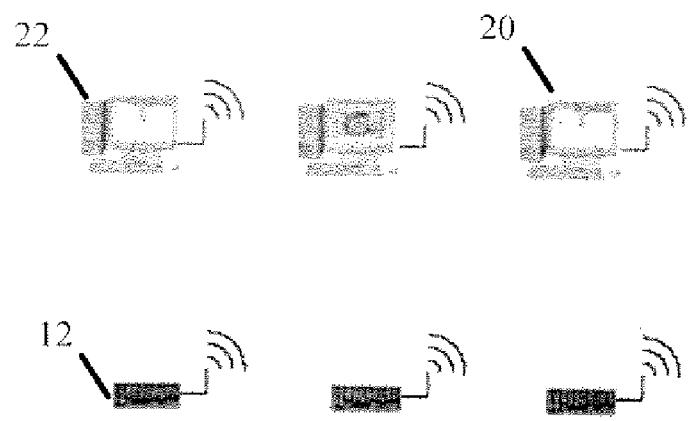
FIGS. 2A and 2B are schematic diagrams of wireless networks deployed in a process control system.
Figure 2B:
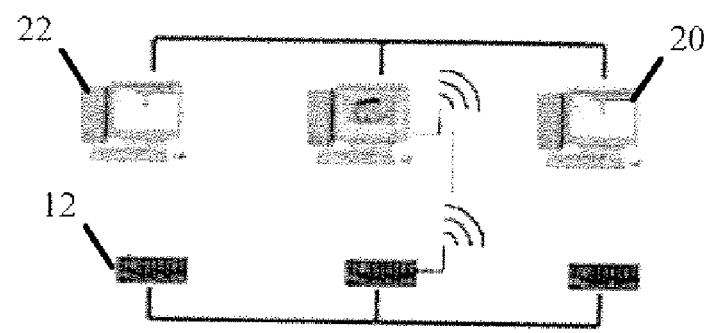

Referring to FIGS. 2A and 2B, examples of wireless mesh networks are shown at the second layer 42 between the workstations 20, 22 and the controllers 12, although it should be understood that the wireless mesh network may be deployed throughout the process control system at any point, as mentioned above. In particular, with the wireless mesh network of FIG. 2A all communications among the distributed nodes are wireless. On the other hand, with the wireless mesh network of FIG. 2B, there is only one wireless connection between a workstation 20, 22 and a controller 12, where the workstations 20, 22 are interconnected by a wireline network and the controllers 12 are interconnected by a wireline network so as to reduce wireless exposure and provide better data quality However, it should be understood that different combinations of wireline and wireless networks may be used, including, but not limited to, a mesh network among the field devices 14, 16 and a wireline network among the controllers 12 and the workstations 20, 22. In another example, a wireless mesh network may be deployed among any of the controllers 12, the field devices 14, 16 and on the workstations 20, 22 along with an underlying wireline network deployed across all or part of the process control system, so as to provide network redundancy.

The deployment of a mesh network anywhere within a process control system results in multiple wireless process control system nodes that transmit mesh network data, such as process control data, within the mesh network. For example, with a wireless mesh network between the controllers 12 and the workstations 20, 22, each of the controllers 12 may correspond to a wireless process control system node. With a wireless mesh network between the field devices 14, 16 and the controllers 12, each of the field devices 14, 16, or each of the associated I/O devices, may correspond to a wireless process control system node. While each of the process control nodes may communicate with the physical network, one or a few process control nodes within a mesh network may be dedicated as a communications gateway node. The gateway node within a wireless mesh network may act as a control node for the mesh network and facilitate communication between different networks, such as between the controllers 12 and the workstations 20, 22 or between the field devices 14, 16 and the controllers 12. For example, as shown in the wireless mesh network of FIG. 2B, one or a few of the controllers 12 may act as a gateway node for the controllers 12. The gateway node for the controllers 12 engages in wireless communication with one or a few of the workstations 20, 22 which in turn acts as a gateway node for the workstations 20, 22.

When implementing a wireless communication network for a process control system, a basic commercial wireless network, such as a commercial off-the-shelf mesh wireless network may be utilized, on top of which process control data communication middleware may be established. The middleware provides an application programming interface (API) to the process control system. The process control system transmits process control data to the middleware with transmission constraint requirements, but with little knowledge or awareness of the underlying wireless network. In other words, the underlying mesh wireless network is transparent to the process control system.

Figure 3A:
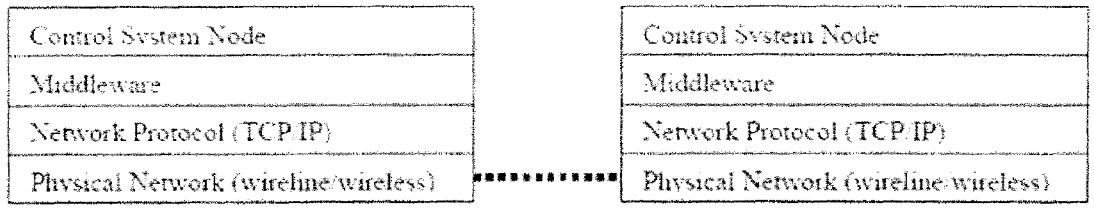
FIGS. 3A and 3B are a representative block diagrams depicting layering of middleware with respect to process control system nodes and a physical network within a process control system utilizing a wireless network.
Figure 3B:
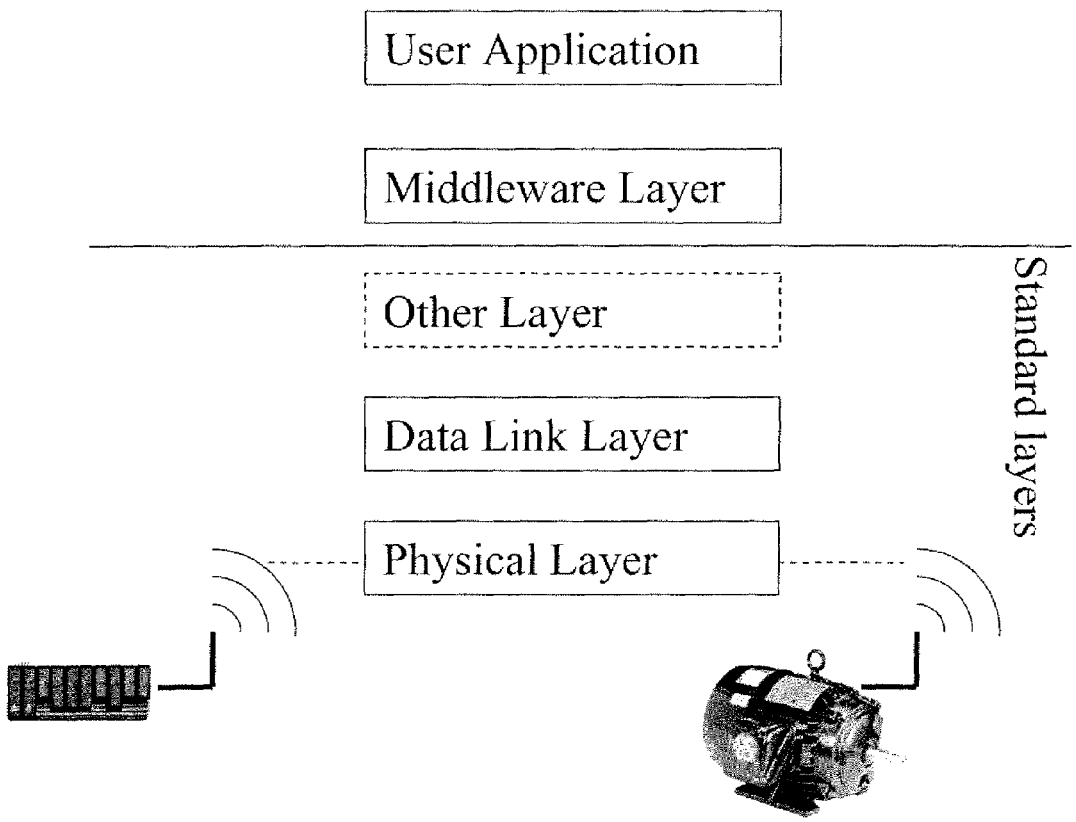

Referring to FIGS. 3A and 3B, examples of the layering of the middleware are shown with respect to the process control system nodes and a physical network such as the data highway 24 or the internet 30. In particular, the middleware is established on top of the wireless network communication protocol (e.g., TCP/IP). The API provided by the middleware for the process control system supports regular process control data communication, such as initialize, open, close, send, receive, acknowledge, cancel, etc. The middleware executes the commands by calling the corresponding functions at the lower layer, and monitors the performance of the calls. The performance monitoring is captured in a set of parameters in the middleware. The difference of parameter values provides information about the difference of the underlying wireline and wireless networks. Examples of parameters that may be tracked include, but are not limited to, a flag indicating a node on the network, the type of network connection, message timeout value, a message round-trip delay, a number of message retries, a flag indicating whether message data is encrypted and the type of encryption, a flag indicating if the node has a redundant network connection, auto message timing indicating whether the lower level automatically translates the message timeout and retries based on round-trip timing or configured values, a flag indicating if there is a failed communication or corrupted integrity, license information and security information. Some or all of the above parameters may be configurable.

During execution, the middleware carries out the commands from the process control system and maintains the parameters. In one example, the middleware automatically adjusts itself by taking into account a response time, bandwidth, number of packets, number of unacknowledged packets, delay times, cost and choosing between transmission media based on time of day, etc. One particular function of the middleware is maintenance of the network connections, because communications within a wireless network may be intermittent. Depending on configuration, the connection may be permanent between two nodes or ad hoc whenever a connection is available. In the case of redundant connections, the middleware may switch between primary and standby connections, where such switches are transparent to the process control applications. The middleware may add variable retries and timeout times for each connection to account for propagation delays, or allow multiple outstanding messages for more efficient bandwidth use.

During an active data transmission, the middleware may perform various tasks, including, but not limited to, round-trip delay timing, send message processing, receive message processing, retry of timeouts, message packing and unpacking, and other optimizations. With the round-trip delay timing task, the initial round-trip delay is based on the time between the synchronous request and the synchronous response when establishing a connection. The round-trip delay may be updated over time by timing the delay between sending a message and the receipt of the acknowledgment. The round-trip delay value is added to the message header to communicate the initial value to the passive end of the connection and to keep both ends of the connection in agreement of the current value.

With the send message processing task, remote connections should have the ability to support multiple outstanding send messages. A window parameter may define limits on how many messages are to be outstanding at any particular time, change the message sending function to send ail messages on the pending message queue up to the window limit, request an acknowledgment only on the last message sent, and add a timer to trigger sending messages that have queued while waiting for an acknowledgment on previous message.

For the received message processing task, when acknowledging a message the time send value may be copied from the received message into the acknowledgment message. This may be used to calculate round-trip times and provides a mechanism for validating that the acknowledgment is associated with the acknowledged message. If an out-of-order message is received, acknowledgment for messages that have been accepted up to this point may be returned. This prevents messages that have already been received but not yet acknowledged from being needlessly retransmitted. When an acknowledgment is received, the time sent value is checked against the time sent value in the message being acknowledged. If the times match, the round-trip time may be averaged into the round-trip time value.

For a retry and timeout task, in order to support multiple outstanding messages, each message must have a timeout value. As messages are acknowledged, they are removed from the acknowledgment time queue leaving messages to be timed out at the proper time. An acknowledgment may acknowledge multiple messages. All messages within the window that precede the sequence number being acknowledged are also acknowledged and are taken off the retransmit queue. Acknowledgments for messages with sequence numbers that are not in the window may be ignored. Management of the retransmit queue handles timing out multiple sets of messages sent at different times with each message given the same fixed amount of time to remain in the retransmit queue before being considered timed out. The retry value may be based on the configured timeout or on the round-trip delay. The timeout value for a link may be based on the number of retries for the link, where the retry count may be configurable depending on the link.

With the message packing and unpacking task, in order to better utilize a given bandwidth on a remote connection, as much information as possible may be packed into each packet, which may be particularly valuable if it is common for several small messages to be queued waiting for a message to be acknowledged or for the window to open up. In order to accomplish this, if two or more messages can fit into a single message buffer, a large message may be allocated and all available messages that will fit are copied into large buffer. As messages are received that contain more than one message as a result of being packed, new receive messages are allocated and data is copied from the packed message into individual message buffers to be processed. All messages contained in a single message may be acknowledged by a single acknowledgment of the last sequence number on the packed messages.

The middleware layer may farther enable many additional kinds of optimizations. If several applications request the same data, multiple requests for the same data may be sent over the wireless link. For remote network connections using delayed transmission media, such as satellite or modems, runtime data may be collected on the remote side of the network over the communication link and distributed to the other side, which reduces the amount of message traffic sent over the network. The remote applications may then retrieve the runtime data from the local middleware instead of requests and over the communications link.

While the above disclosure describes the implementation and deployment of a wireless mesh network within a process control system, wireless mesh networks may also be deployed in whole or in part outside of a process control system. For example, mesh networks may be deployed in areas that are inhospitable or inaccessible by traditional wireline networks. Further, mesh networks may be deployed to collect non-critical process control data or auxiliary data which may be cost prohibitive to collect using traditional wireline networks, or which may be otherwise inaccessible by the process control system. Auxiliary data may include data that is unrelated to process control but which may nonetheless be useful to a user accessing the auxiliary data from within the process control system, including, but not limited to, control room light switches, stock prices, weather forecasts, etc. However, because a process control system can only communicate with I/O devices that it understands, mesh network data generated from wireless I/O devices within a mesh network, whether it be critical process control data, non-critical process control data, auxiliary data, etc., should be provided to a process control system as if the mesh network data is native to the process control system. This may further apply to mesh networks that are deployed within a process control system as part of the control system itself. In other words, an appropriate interface merges mesh network data from a mesh network to a process control system. In particular, the mesh network data should be provided to the process control system 10 so that the mesh network data shows up in the process control system as if it is native process control data. Although mesh networks and corresponding mesh components have been, and are further, disclosed, it should be understood that different wireless technologies and different wireless networks may be utilized in place of wireless mesh networks, and that communications between a process control system and other wireless networks may be facilitated by the methods and apparatus described herein.

Figure 4:
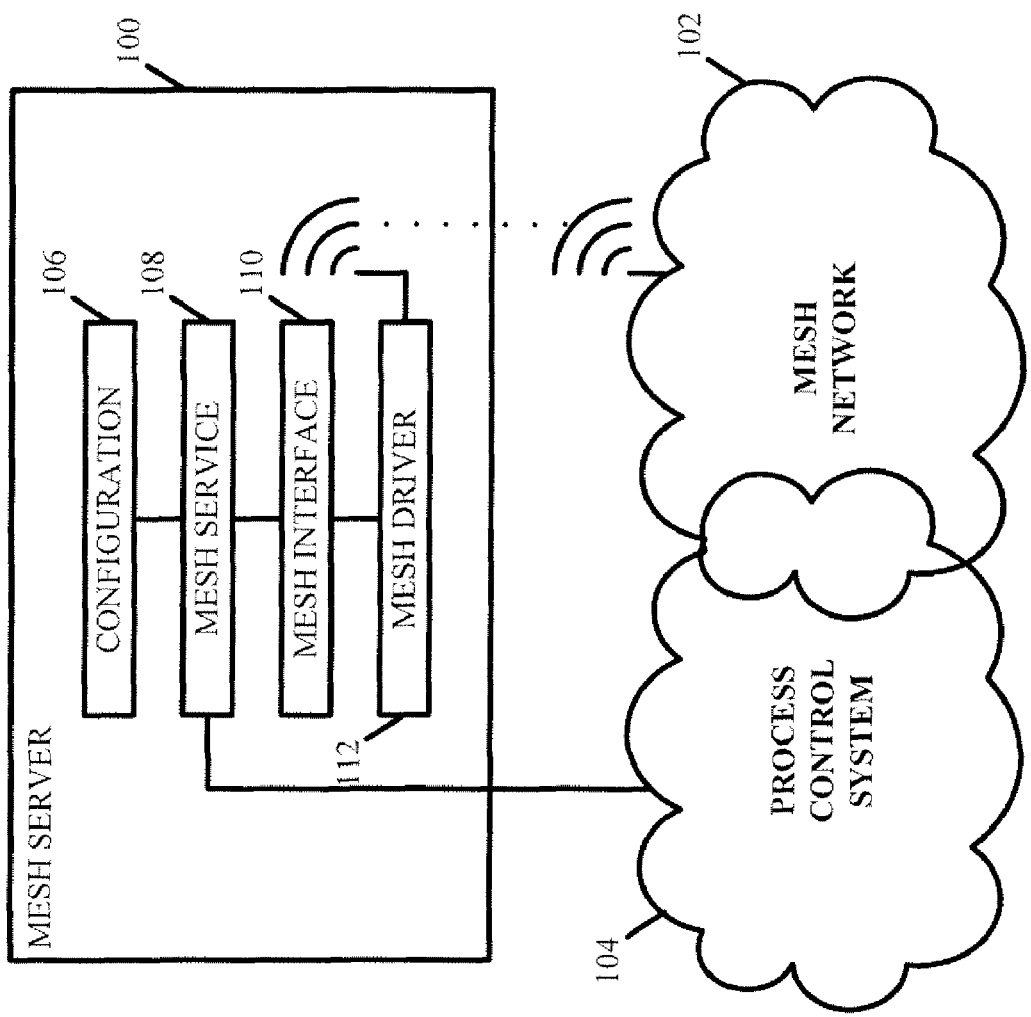
FIG. 4 is a representative block diagram of a server for facilitating communication between a process control system and a wireless network.

Referring to FIG. 4, an example of a mesh server 100 for facilitating communications between a mesh network 102 and a process control system 104 is shown. The mesh server 100 provides a software package for merging wireless data with a process control system, and vice versa. The mesh server 100 may be provided as a single server or computer, or as a cluster of servers or computers. Although one mesh network 102 and one process control system 104 are shown, the mesh server 100 may be used to facilitate communications between a plurality of mesh networks and one or more process control systems. Further, although the following disclosure primarily involves merging mesh network data from the wireless mesh network 102 to process control system 104, it should be understood that the mesh server 100 may facilitate communicating process control information from the process control system to the wireless mesh network 102.

As seen in FIG. 4, the mesh server 100 is communicatively coupled to the mesh network 102 via a wireless communication link, which may be accomplished using commercial off-the-shelf wireless communication products, including wireless receivers and transmitters. As is understood, the wireless mesh network 102 is a decentralized network having a plurality of nodes which may be interconnected so that each node need only transmit to the nearest node or plurality of nodes. The wireless mesh network 102 provides a relatively inexpensive yet robust wireless network that may be easily repaired should any of the nodes cease to function or should any of the communication links within the wireless network degrade or breakdown. Still further, a wireless mesh network may be easily expanded to include additional nodes and input/output data points.

Each node may correspond to one or more I/O devices which generate information and which may receive information, such as instructions from the process control system 104. Each node may correspond to one or more input/output data points where each input/output data point is a source of information from the wireless mesh network 102. For example, each I/O device within the mesh network may correspond to an input/output data point within the mesh network. A central control node, such as a central control computer, may be provided within the mesh network 102 to control the mesh network nodes. The central control node may act as a communication gateway node for the mesh network to communicate mesh network data from the input/output data points to the mesh server 100, and each node within the mesh network 102 may function as a repeater to transmit data from other nodes to the central control node. It is noted, however, that the central control node need not necessarily correspond to an I/O device to collect or provide mesh network data itself.

The process control system 104, which may be the process control system 10 disclosed above or any other process control system implementation, may support object linking and embedding (OLE) for process control (OPC), or another process control interface. OPC provides a common process control interface for entities, such as field devices 14, 16, within the process control system 104. The process control system 104 may be communicatively coupled to the mesh server 100 via a communications link, such as an OPC communications link. In particular, the process control system 104 may include an OPC server (not shown) which communicates with the mesh server 100. As shown in FIG. 4, part of the mesh network 102 may be deployed in the same area as the process control system 104, and may collect the same data as the process control system 104. Nonetheless, the mesh network 102, including the input/output data points providing redundancy for input/output data points of the process control system, utilizes the mesh server 100 to merge mesh network data into the process control system 104.

Data point placeholders are defined within the process control system 104, with a data point placeholder configured within the process control system 104 for each input/output data point within the mesh network 102. In particular, a user may configure each data point placeholder in the process control system 104 for each input/output data point in the mesh network 102 that the user wants to merge into the process control system 104. The data point placeholders are treated within the process control system as if they are input/output data points native to the process control system 104, as opposed to input/output data points in the mesh network 102. A data point placeholder provides a unique identification for an input/output data point within the mesh network 102, and reserves a spot within the process control system for mesh network data from the corresponding input/output data point. In other words, a data point placeholder provides a way for mesh network data from an input/output data point in the mesh network 102 to be referenced within the process control system, without establishing a new input/output data point in the process control system and without requiring the process control system to know of the existence of the mesh network, much less the input/output data point.

The unique identification of a data point placeholder distinguishes the different input/output data points. For example, the unique identification may specify the name of a component within the wireless mesh network 102, such as the switch for a fan XYZ (e.g., "on_XYZ"), where an input/output data point corresponds to an I/O device that generates the on/off data for the fan (e.g., a switch) and mesh network data from the input/output data point is the on/off data from the switch. As discussed further below, this mesh network data is provided to the mesh server 100, which in turn provides the data to the corresponding data point placeholder (e.g., "on_XYZ") in the process control system 104. The data point placeholders may then be treated within the process control system 104 as if they are process control system input/output data points, even though the process control system 104 does not necessarily know the source of the data. As a result, the mesh network data may be treated as process control data native to the process control system 104. Further, the process control system may use the data point placeholders to provide process control data, such as instructions or requests, to the input/output data points in the wireless mesh network 102 via the mesh server 100, as will be described further below. It is noted, however, that data values from the mesh network 102 may not be as real-time to the process control system 104 as compared to process control data from the process control system 104. However, the mesh network data that may still be used includes, but is not limited to, configuration data, displayed data, alarm/event data, the diagnostics data, etc., and the mesh network data may be used via a tool or toolset in the control system. Further, the mesh network data may be employed to improve process control in the process control system 104.

The mesh server 100 includes a configuration 106, a mesh service 108, and a mesh interface 110. A mesh driver 112 may be published by the mesh network 102, and provided to the mesh server 100. The mesh driver 112 may be assumed to exist within the mesh network 102, and different mesh networks 102 may support different drivers. The mesh server 100 accesses the mesh network 102 through the mesh driver 112, and accesses the process control system 104 through the process control interface, for example through OPC. The mesh server 100 thus provides the software to interface between the mesh network 102 and the process control system 104. The mesh server 100 may facilitate the use of the process control system 104 as a process control system for the underlying mesh network 102, as will be described further.

The configuration 106 is stored within a file in a memory or database of the mesh server 100, and may be provided as an XML data file. The configuration 106 includes a list of data point maps between the process control system data point placeholders and the mesh network input/output data points. In particular, each data point map identifies which data point placeholders correspond with which input/output data points. The data point map also defines where data attributes defined in OPC come from, including, but not limited to, attributes such as timestamp, quality, etc.

Different data point maps may be provided for different groups of input/output data points or for different groups of data point placeholders. For example, the data point maps may be defined according to the mesh network 102 to which an input/output data point may belong, or according to the process control system to which a data point placeholder may belong. Alternatively, entities within the mesh network 102, and corresponding input/output data points, may be grouped according logical groupings, such as location, update frequency or function. For a mesh network 102 deployed in a process control system, entities may include groups of devices and/or equipment such as loops, sub-units, units, areas or other process control entities. In short, different data point maps may be provided for each entity within the mesh network 102, such as a data point map for each loop, sub-unit, a unit, area or any other logical grouping.

Further, the configuration 106 includes an update period which dictates how often mesh network data needs to be retrieved from the mesh network 102, updated to the mesh server 100 and provided to the process control system 104. Different update periods may be provided for different data point maps. For example, mesh network data from some input/output data points may need to be updated to the process control system 104 more frequently than mesh network data from other input/output data points. Connection information may also be provided with the configuration 106 to provide the information necessary to connect with the process control system OPC server.

The mesh service 108 communicates with the process control system 104 via a communications link. As mentioned above, the communications link may be an OPC communications link, although the OPC communications link may be replaced with a proprietary link in which the mesh service 108 invokes a proprietary or private process control system application programming interface (API) to read/write data directly to/from the process control system 104, in which case the configuration 106 may indicate how to handle attributes of the data, such as timestamp, quality, etc. The mesh service 108 makes function calls to the mesh interface 110, where the function calls may be requests to read data from, or write data to, the mesh network 102. If the mesh service 108 is executed on a Windows workstation, the mesh service 108 may be run as a Windows service.

The mesh interface 110 serves as a interface to access the mesh network 102. The mesh interface is responsible for marshalling calls between the mesh service 108 and the mesh network 102. The mesh interface 110 receives requests from the mesh service 108 and makes a request to the mesh driver 112. The mesh interface 110 further translates the request into a request understood by the mesh driver API.

In one example, the mesh interface 110 provides a set of uniformed APIs for the mesh service 108, and calls into the mesh driver 110 to access data from the mesh network 102. A different API may be provided and invoked by the mesh interface 110 for each mesh network 102 (or each mesh driver 112) that interfaces with the mesh server 100. In another example, the mesh interface 110 may be provided as a unified wireless interface which serves as a common interface to access the mesh network, and the common interface may serve as a data source for any third party clients. The API for the common interface may be defined to best fit the process control system requirements. For example, the mesh interface 110 may use OPC as a common interface. In yet another example, the mesh service 108 and the mesh interface 110 may be provided as a unified interface.

In operation, the mesh service 108 reads the configuration 106 and connects with the process control system by the communications link. Using the data point map from the configuration 106, the mesh service 108 may create data point placeholders within the process control system 104 for any unmapped input/output data points within the mesh network 102. The mesh service 108 further accesses the mesh network 102 via the mesh driver 112 of the mesh interface 110. In order to communicate with the mesh network 102, the mesh service 108 makes function calls to the mesh interface 110. The mesh interface 110 receives a request from the mesh service 108 makes a request to the mesh driver 112. In particular, the mesh interface 110 translates the mesh service request into a request understood by the mesh driver API. In other words, the mesh interface 110 marshals calls between the mesh service 108 and the mesh network 102.

For each input/output data point in the mesh network 102, and for each data point map, the mesh service 108 reads mesh network data from the mesh network 102, for example via the central control node. As such, the mesh server 100 may receive the mesh network data for some or all of the entities within the mesh network 102, including some or all of the input/output data points within the mesh network 102. In addition, because each data point map may correspond to different mesh network, reading mesh network data for each data point map may result in reading mesh network data for a plurality of wireless mesh networks. However, it should be understood that mesh network data generated by input/output data points may be read individually, for example in response to a request from the process control system 104 for mesh network data from a data point placeholder, and hence from a particular input/output data point in the mesh network.

Using the data point map, each item of mesh network data is mapped between the input/output data point which provided the mesh network data and the data point placeholder in the process control system 104 that corresponds to the input/output data point. The mapped mesh network data is then written to the data point placeholder of the process control system 104 which corresponds to the input/output data point. In one example, the data may be read from the mesh network 102 and written immediately to the OPC server of the process control system 104 through OPC to minimize any delay in providing the mesh network data in real-time.

After writing data to the process control system 104, the mesh service 108 may sleep for a configurable length of time, after which the mesh service 108 may repeat the read/write operation between the mesh network 102 and process control system 104. As indicated above, the read write operation may be dictated by the update periods defined in the configuration 106.

When the mesh network data is written to a data point placeholder in the process control system 104, the process control system treats the data point placeholder as an input/output data point within the process control system 104 and the mesh network data is provided within the process control system 104 as process control data native to the process control system 104. As a result, the mesh network 102, and the input/output data points therein, are transparent to the process control system 104. A user is able to manage the mesh network data within the process control system environment using any process control system tool or toolset, including, but not limited to, diagnostics routines, process control operations, maintenance routines, business functions, analysis routines, and the like.

In addition to providing mesh network data to a process control system 104, the mesh server 100 may be used to provide process control information, such as commands requests etc., to input/output data points within the mesh network 102. In particular, an indication may be provided in the configuration 106 to write data front the process control system 104 to the mesh network 102, and the mesh service 108 may read the process control data through the process control interface and write the data to the mesh driver 112. For example, the mesh service 108 may receive process control data from the process control system via the process control interface, such as OPC. The process control data may include a command to turn on fan XYZ. Using the data point placeholder (e.g., "on_XYZ") of the process control system 104 corresponding to the input/output data point of the switch of fan XYZ, the process control system 104 may issue the command using the data point placeholder as an input/output data point, and the command is read by the mesh server 100. Using the data point maps from the configuration 106, the mesh service 108 maps the process control data between the data point placeholder of the process control system and the corresponding input/output data point of the mesh network 102. For example, the mesh service 108 may map the "on" command between the data point placeholder "on_XYZ" and the wireless node corresponding to the I/O device of the switch for fan XYZ. Communication with the mesh network 102 may be established, as described above, and the mapped process control data may be written to the mesh network 102 via the mesh driver 112.

If the OPC link between the mesh service 108 and the process control system 104 is replaced with a proprietary link and the process control system interface utilizes a private process control system API, as mentioned above, the mesh service 108 may invoke the private process control system API to read a mesh network data directly from the mesh network 102 to the process control system 104, and particularly to write the mesh network data directly from the mesh network 102 to the data point placeholder of the process control system 104. Likewise, read/write operations may be performed directly from the process control system 104 to the mesh network 102.

Still further, using the mesh server 100, the process control system 104 may be used as a pure control system for the underlying mesh network 102, which may be particularly useful if the mesh network 102 is being used as all or part of the process control system 104 (e.g. gradual replacement of wireline I/O devices within the process control system). Generally, a process control system includes various I/O devices for entities within the process control system, such as sensors, actuators, etc. for components, controllers, equipment, field devices, etc. Each I/O device may correspond to an input/output data point within the process control system software. However, using the mesh server 100, the process control system software may be deployed without any input/output data points. Instead, data point placeholders are used in place of the input/output data points.

As a result, a wireless mesh network deployed in all or in part of the process control system 104 may be used to collect process control data, and provide the process control data to the process control system 104 via the mesh server 100. The process control system 104 may use data point placeholders for the input/output data points within the wireless mesh network 102, and, as described above, the process control system software may utilize only data point placeholders in place of input/output data points. The process control system 104, including the application and algorithms therein, use the data point placeholders as input/output data points native to the process control system 104 in order to facilitate operations of the physical part of the process control system 104, such as the controllers 12, the field devices 14, 16, etc., including controlling, communicating or otherwise interacting with an entity in the process control system 104.

Although the forgoing text sets Forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing, every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A non-transitory computer-readable medium having computer-executable instructions for implementing a method of merging wireless data collected from a wireless network into a process control system, wherein the wireless data is collected from an input/output data point not native to the process control system, and wherein the input/output data point not native to the process control system includes a source of information from an input/output device outside the process control system, the computer-executable instructions comprising instructions for:

receiving wireless data from the input/output data point of the wireless network not native to the process control system;

mapping the wireless data between the input/output data point of the wireless network not native to the process control system and a data point placeholder within the process control system corresponding to the input/output data point of the wireless network not native to the process control system, wherein the data point placeholder provides an identification for the input/output data point of the wireless network not native to the process control system and relates to a place reserved within the process control system for the wireless data without establishing a corresponding input/output data point native to the process control system, and wherein an input/output data point native to the process control system comprises a source of information from an input/output device within the process control system;

establishing communication with the process control system via a process control interface, wherein the process control interface comprises a common interface for entities within the process control system; and writing the mapped wireless data to the corresponding data point placeholder of the process control system via the process control interface.

2. The computer-readable medium having computer-executable instructions of claim 1, the computer-executable instructions further comprising instructions for providing the wireless data within the process control system as process control data native to the process control system.

3. The computer-readable medium having computer-executable instructions of claim 2, wherein providing the wireless data within the process control system as process control data native to the process control system comprises utilizing each of the data point placeholders within the process control system as an input/output data point from the process control system.

4. The computer-readable medium having computer-executable instructions of claim 2, the computer-executable instructions further comprising instructions for managing the wireless data with a process control tool.

5. The computer-readable medium having computer-executable instructions of claim 1, wherein the wireless network comprises a plurality of entities each associated with an input/output data point of the wireless network, and wherein the process control system comprises one or more of the plurality of entities from the wireless network.

6. The computer-readable medium having computer-executable instructions of claim 1, the computer-executable instructions further comprising instructions for:

receiving process control data from the process control system via the process control interface;

mapping the process control data between a data point placeholder of the process control system and an input/output data point of the wireless network;

establishing communication with the wireless network via a wireless network driver; and writing the mapped process control data to the wireless network via the wireless network driver.

7. The computer-readable medium having computer-executable instructions of claim 1, the computer-executable instructions further comprising instructions for:

receiving wireless data relating to a plurality of entities, wherein each of the plurality of entities corresponds to an input/output data point not native to the process control system, each of the input/output data points maintained in a data point map which corresponds each input/output data point with a data point placeholder within the process control system;

mapping the wireless data for each of the plurality of entities between the input/output data point and the corresponding data point placeholder according to the data point map; and writing the mapped wireless data for each of the plurality of entities to the corresponding data point placeholder of the process control system via the process control interface.

8. The computer-readable medium having computer-executable instructions of claim 7, wherein receiving wireless data relating to a plurality of entities comprises receiving the wireless data relating to the plurality of entities from a plurality of wireless networks.

9. The computer-readable medium having computer-executable instructions of claim 7, wherein the input/output data points are maintained in a plurality of data point maps and wherein receiving wireless data relating to a plurality of entities comprises receiving the wireless data at an update rate established according to the data point map that comprises the input/output data point corresponding to the entity of the wireless data.

10. The computer-readable medium having computer-executable instructions of claim 1, wherein the wireless network comprises a decentralized wireless network infrastructure.

11. The computer-readable medium having computer-executable instructions of claim 1, wherein the wireless network comprises a mesh network and wherein the wireless data comprises mesh network data collected from the mesh network.

12. The computer-readable medium having computer-executable instructions of claim 1, wherein the wireless network comprises a process control wireless communications network.

13. The computer-readable medium having computer-executable instructions of claim 1, wherein the process control interface comprises object linking and embedding (OLE) for process control (OPC).

14. The computer-readable medium having computer-executable instructions of claim 13, wherein establishing communication with the process control system comprises establishing communication with the process control system via an OPC communications link.

15. The computer-readable medium having computer-executable instructions of claim 1, wherein the process control system interface comprises a private process control system application program interface, wherein establishing communication with the process control system comprises invoking the private process control system application program interface, wherein receiving wireless data from the wireless network comprises reading the wireless data from the wireless network to the process control system, and wherein writing the mapped wireless data to the corresponding data point placeholder of the process control system comprises writing the mapped wireless data directly from the wireless network to the process control system.

16. The computer-readable medium having computer-executable instructions of claim 1, wherein the wireless data comprises auxiliary data collected by the wireless network outside of the process control system.

17. The computer-readable medium having computer-executable instructions of claim 1, wherein the wireless data comprises process control data collected within the wireless network.

18. A non-transitory computer-readable medium having computer-executable instructions for implementing a method of communication between a process control system and an input/output data point within a mesh network, wherein the input/output data point within the mesh network is not native to the process control system, and wherein the input/output data point within the mesh network not native to the process control system includes a source of information from an input-output device outside the process control system, the computer-executable instructions comprising instructions for:

receiving process control data from the process control system;

mapping the process control data between a data point placeholder within the process control system and the input/output data point within the mesh network not native to the process control system, wherein the data point placeholder provides an identification for the input/output data point within the mesh network not native to the process control system and relates to a place within the process control system for providing process control data to the input/output data point within the mesh network not native to the process control system without establishing a corresponding input/output data point native to the process control system, and wherein an input/output data point native to the process control system comprises a source of information from an input/output device within the process control system;

establishing communication with the mesh network via a mesh network interface; and writing the mapped process control data to the input/output data point within the mesh network not native to the process control system via the mesh network interface.

19. The computer-readable medium having computer-executable instructions of claim 18, wherein receiving process control data from the process control system comprises receiving process control data from the process control system via a process control interface, wherein the process control interface comprises a common interface for entities within the process control system.

20. The computer-readable medium having computer-executable instructions of claim 19, wherein the process control interface comprises object linking and embedding (OLE) for process control (OPC).

21. The computer-readable medium having computer-executable instructions of claim 20, wherein receiving process control data from the process control system comprises receiving process control data from the process control system via an OPC communications link.

22. The computer-readable medium having computer-executable instructions of claim 18, wherein the mesh network interface comprises a common interface for a plurality of mesh networks.

23. The computer-readable medium having computer-executable instructions of claim 18, wherein the process control system comprises one or more entities each comprising an input/output data point and communicatively coupled to the mesh network, wherein the process control system comprises a data point placeholder for each input/output data point.

24. The computer-readable medium having computer-executable instructions of claim 18, wherein the process control system comprises a private process control system application program interface, the method further comprising invoking the private process control system application program interface; and reading the process control data from the process control system to the mesh network, wherein writing the mapped process control data to the input/output data point within the mesh network not native to the process control system comprises writing the mapped wireless data directly from the process control system to the mesh network.

* * * * *

UNITED STATES PATENT AND TRADEMARK OFFICE
CERTIFICATE OF CORRECTION

| | | |
|---|---|---|
| PATENT NO. | : 7,822,802 B2 | |
| APPLICATION NO. | : 11/537489 | |
| DATED | : October 26, 2010 | |
| INVENTOR(S) | : Deji Chen et al. | |

It is certified that error appears in the above-identified patent and that said Letters Patent is hereby corrected as shown below:

In the Specification:

At Column 12, line 9, "ail" should be -- all --.

At Column 16, line 31, "a" should be -- an --.

Signed and Sealed this
Twenty-first Day of June, 2011

David J. Kappos
*Director of the United States Patent and Trademark Office*